United States Patent
Doan et al.

(10) Patent No.: US 12,394,257 B2
(45) Date of Patent: Aug. 19, 2025

(54) MANAGING DATA PROTECTION SETTINGS FOR AN ELECTRONIC CONTROL UNIT

(71) Applicant: RIVIAN IP HOLDINGS, LLC, Irvine, CA (US)

(72) Inventors: Jack Austin Doan, Addison, TX (US); Michael Lamunion, Sunnyvale, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 625 days.

(21) Appl. No.: 17/742,859

(22) Filed: May 12, 2022

(65) Prior Publication Data

US 2023/0368588 A1 Nov. 16, 2023

(51) Int. Cl.
| | |
|---|---|
| G07C 5/08 | (2006.01) |
| B60R 16/023 | (2006.01) |
| G01R 31/3185 | (2006.01) |
| G07C 5/00 | (2006.01) |

(52) U.S. Cl.
CPC ........ *G07C 5/0808* (2013.01); *B60R 16/0231* (2013.01); *G01R 31/318569* (2013.01); *G01R 31/318572* (2013.01); *G07C 5/008* (2013.01); *G07C 5/0825* (2013.01)

(58) Field of Classification Search
CPC .... G07C 5/0808; G07C 5/008; G07C 5/0825; G07C 5/0816; B60R 16/0231; G01R 31/318569; G01R 31/318572; G06F 21/62; G06F 21/57; G06Q 50/40
See application file for complete search history.

(56) References Cited

U.S. PATENT DOCUMENTS

| | | | | |
|---|---|---|---|---|
| 2003/0037213 A1* | 2/2003 | Mittag | ............... | G06F 21/57 |
| | | | | 711/163 |
| 2008/0181076 A1* | 7/2008 | Lee | ................ | G11B 20/1217 |
| | | | | 369/53.17 |
| 2014/0006798 A1* | 1/2014 | Prakash | ............. | G06F 21/6218 |
| | | | | 713/189 |
| 2015/0331686 A1* | 11/2015 | Petersen | ................ | G06F 8/65 |
| | | | | 701/31.5 |

OTHER PUBLICATIONS

"Boundary Scan, JTAG, IEEE 1149 Tutorial, Electronics Notes," Electronicsnotes, retrieved from https://www.electronics-notes.com/articles/test-methods/boundary-scan-jtag-ieee1149/what-is-boundary-scan-jtag.php, retrieved on May 4, 2023, 3 pages.

"OBD II diagnostic interface pinout, pinoutguide.com", Pinoutguide.com, retrieved from https://pinoutguide.com/CarElectronics/car_obd2_pinout.shtml, retrieved on May 4, 2023, 2 pages.

* cited by examiner

*Primary Examiner* — James J Lee
*Assistant Examiner* — Jonathan E Reinert
(74) *Attorney, Agent, or Firm* — Haley Guiliano LLP

(57) ABSTRACT

A vehicle includes a plurality of electronic control units (ECUs), and determines whether any of the ECUs are read/write protected. The vehicle includes control circuitry that is configured to determine a data protection setting for at least one ECU, generate a diagnostic code indicator based on the data protection setting, and generate a visual indicator based on the diagnostic code indicator.

19 Claims, 6 Drawing Sheets

MANAGING DATA PROTECTION SETTINGS FOR AN ELECTRONIC CONTROL UNIT

INTRODUCTION

The present disclosure is directed to managing data protection settings for an electronic control unit of a vehicle and, more particularly, to generating a diagnostic code indicator if ECUs are not read/write protected.

SUMMARY

The present disclosure is directed to a check for data protection settings of software such as firmware of a vehicle. For example, the present disclosure is directed to ensuring vehicles are not distributed or otherwise operated without data protections enabled. In an illustrative example, electronic control units (ECUs) of a vehicle may control subsystems such as charging systems or other systems, and it may be desired to protect the ECUs (e.g., firmware thereof) from running unauthorized or modified code, allowing stored computer instructions to be accessed or modified, or a combination thereof.

In some embodiments, the present disclosure is directed to a method for indicating control protections for a vehicle. The method includes causing, using control circuitry, instructions stored on at least one electronic control unit (ECU) to execute prior to operation of vehicle. The method also includes determining, based on execution of the stored instructions and using control circuitry, whether a data protection setting is disabled for at least one electronic control unit (ECU). For example, the control circuitry may determine a data protection setting for at least one electronic control unit (ECU). The method also includes generating, using the control circuitry, a diagnostic code indicator based on the data protection setting. The method also includes generating, using the control circuitry, a visual indicator on an output device, based on the diagnostic code indicator. For example, in some embodiments, determining the data protection setting for the at least one ECU includes determining a configuration of a processor of the at least one ECU, and comparing the configuration to a reference configuration stored in memory.

In some embodiments, the data protection setting includes at least one of a status indicated at a Joint Test Action Group (JTAG) test action port, a flash readout protection status, a bit setting, a fuse setting or a combination thereof.

In some embodiments, the vehicle includes a plurality of ECUs that include the at least one ECU, and each ECU of the plurality of ECUs is associated with a subsystem of the vehicle. In some such embodiments, the diagnostic code indicator includes at least one identifier corresponding to the at least one ECU, and the at least one identifier is distinguishable from identifiers corresponding to other ECUs of the plurality of ECUs.

In some embodiments, determining the data protection setting for the at least one ECU includes determining the at least ECU does not include firmware, and determining the at least one ECU is unlocked for reading and writing.

In some embodiments, determining the data protection setting for the at least one ECU includes determining the at least ECU comprises firmware, and determining the at least one ECU is unlocked for reading and writing. In some embodiments, determining the data protection setting of the at least one ECU includes determining the at least ECU comprises firmware, determining the at least one ECU is locked for reading and writing, and determining the at least one firmware protection status corresponds to the at least one ECU being protected.

In some embodiments, generating the indicator includes transmitting the diagnostic code indicator to a diagnostic port of the vehicle, linking the diagnostic code indicator to a malfunction indicator lamp (MIL) arranged at a console of the vehicle, and causing the MIL to illuminate.

In some embodiments, generating the diagnostic code indicator is performed during manufacturing, the method further includes identifying the at least one ECU as having data protections disabled based on the data protection setting. In some embodiments, the method includes, in response to identifying the at least one ECU, performing one of replacing the at least one ECU with a new ECU, updating the data protection setting of the at least one ECU to enable protections, flagging the vehicle as noncompliant, or a combination thereof. In some embodiments, the method includes disabling booting the at least one ECU from a communications interface based on the diagnostic code.

In some embodiments, the present disclosure is directed to a system that includes control circuitry and at least one output device. The control circuitry is configured to cause instructions for at least one electronic control unit (ECU) to execute prior to operation of a vehicle. The control circuitry is also configured to determine, based on execution of the stored instructions, whether a data protection setting is disabled for at least one electronic control unit (ECU). The instructions are stored in memory storage of the at least one ECU, a central ECU, or any other suitable device. For example, the control circuitry may be configured to determine a data protection setting for at least one ECU of the vehicle and generate a diagnostic code indicator based on the data protection setting. The at least one output device is configured to generate at least one visual indicator corresponding to the diagnostic code indicator.

In some embodiments, the control circuitry is configured to determine the data protection setting for the at least one ECU by determining a configuration of a processor of the at least one ECU, and comparing the configuration to a reference configuration stored in memory. In some embodiments, the control circuitry is configured to determine the data protection setting by determining whether the at least ECU includes firmware, and determining whether the at least one ECU is unlocked for reading and writing. In some embodiments, the data protection setting includes at least one of a Joint Test Action Group (JTAG) lock status, a flash readout protection status, a bit setting to disable booting, or a fuse setting to disable booting.

In some embodiments, the vehicle includes a plurality of ECUs that include the at least one ECU, and the diagnostic code indicator includes at least one identifier corresponding to the at least one ECU. The at least one identifier is distinguishable from identifiers corresponding to other ECUs of the vehicle. For example, the at least one identifier may include a letter or number (e.g., an index or address on a communications bus), or a combination thereof.

In some embodiments, the system includes a diagnostics port configured to provide access to a communications bus of the vehicle, and a malfunction indicator lamp (MIL) arranged at a console of the vehicle. In some such embodiments, the control circuitry is further configured to generate the indicator by transmitting the diagnostic code indicator to the diagnostic port, linking the diagnostic code indicator to the MIL, and causing the MIL to illuminate.

In some embodiments, the control circuitry is distributed among a plurality of ECUs coupled by a communications bus. In some embodiments, the vehicle includes a plurality of ECUs, including the at least one ECU, the plurality of ECUs are coupled via a communications bus, and one ECU includes the control circuitry configured to generate the diagnostic code indicator.

In some embodiments, the present disclosure is directed to a non-transitory computer-readable medium having instructions encoded thereon. When executed by control circuitry, the instructions cause the control circuitry to cause diagnostic instructions stored on at least one electronic control unit (ECU) to execute prior to operation of the vehicle. The instructions further cause the control circuitry to determine (e.g., based on execution of the diagnostic instructions) whether a data protection setting is disabled for the at least one ECU, generate a diagnostic code indicator based on the data protection setting, and cause a visual indicator to be generated on an output device, based on the diagnostic code indicator. In some embodiments, when executed by control circuitry, the instructions cause the control circuitry to determine a data protection setting for at least one electronic control unit (ECU), generate a diagnostic code indicator based on the data protection setting, and cause a visual indicator to be generated on an output device based on the diagnostic code indicator. In some embodiments, the non-transitory computer-readable medium includes diagnostic instructions for causing the control circuitry to determine the data protection setting by determining whether the at least ECU includes firmware, and determining whether the at least one ECU is unlocked for reading and writing. In some embodiments, the diagnostic instructions are stored in memory of each ECU of a plurality of ECUs. In some embodiments, each ECU includes firmware, which includes instructions for determining the data protection setting.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION OF THE DRAWINGS

Figure 1:
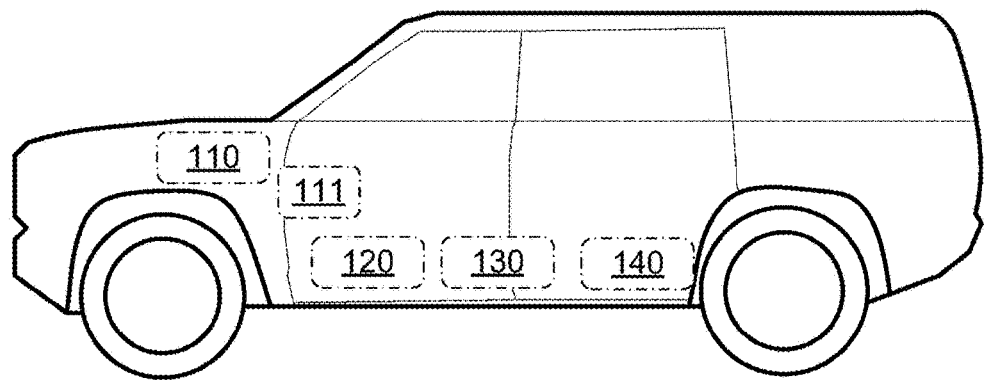
FIG. 1 shows a side view of an illustrative vehicle having controllers and an interface, in accordance with some embodiments of the present disclosure.

Vehicles may include memory having firmware stored therein. For example, a vehicle may include one or more controllers, referred to herein as "engine control units" or "electronic control units" (ECUs), each having a corresponding firmware installed. Under some circumstances, it is important to protect the firmware contents of ECUs, both from reading (e.g., to protect stored data, protected data, proprietary information, intellectual property, or other information) and from unauthorized writing (e.g., to protect the ECU itself and the vehicle in which it is installed). However, this protection may require that each and every microcontroller inside each and every ECU of a vehicle may need to have particular protection settings enabled (e.g., flash readout protection, 'enabling' a setting for disabling debugging, or a test access port configured for Joint Test Action Group (JTAG) standards). It would be advantageous to check for, or otherwise confirm, protection settings for each vehicle produced at an appropriate time. For example, developers (e.g., software developers) may need these protections disabled to be able to interact with the modules or ECUs, but the protections may need to be set or reset consistently after development (e.g., before leaving the production line).

In some embodiments, the present disclosure is directed to using a diagnostic code system to indicate unprotected data settings. The diagnostic code system may include a diagnostic trouble code (DTC) system or any other suitable system for identifying and indicating diagnostic statuses, issues, errors, or warnings. For example, for an ECU associated with a subsystem, in addition to subsystem errors such as broken sensors, operating parameters out of range, or other problem related to the subsystem controlled by the ECU, the ECU may check for data protection settings using software or firmware installed in memory of the ECU. The ECU may utilize the instructions to perform a routine (e.g., execute computer instructions stored in memory) at boot up, periodically during operation, or both, to check a set of relevant diagnostic codes for errors or failures. In some embodiments, the instructions may be included in firmware of the ECU, and may be configured to execute upon boot up, at a predetermined frequency, in response to an event or trigger, or a combination thereof, for example. In some embodiments, the instructions may be included in software that is loaded into memory of the ECU to perform diagnostic checks, and may be configured to execute upon boot up, at a predetermined frequency, in response to an input or trigger, or a combination thereof, for example. For example, the ECU may set, store, determine, or otherwise manage statuses associated with each diagnostic code such as, for example, pass, fail, not tested, confirmed, unknown, warning, or any other suitable status. The ECU may determine that a particular status, or subset of statuses (e.g., fail, warning, not tested), corresponds to data protection settings being unprotected or otherwise not confirmed as protected. In response, the ECU may generate a diagnostic code indicator by, for example, communicating a diagnostic code status to a diagnostic manager or diagnostics port of the vehicle, storing the diagnostic code status, generating an error message, or otherwise providing an indication (e.g., a diagnostic code indicator) of the status corresponding to unprotected data. A visual indicator may be generated (e.g., an illuminated icon on a console) to alert a user of at least one diagnostic code is in error or otherwise may require investigation. The diagnostic code indicator may include the status itself (e.g., as transmitted to a diagnostic manager or communications bus), a warning message, a flag (e.g., stored in memory and/or transmitted to a communications bus), any other suitable indicator, or any combination thereof. Accordingly, a vehicle may be checked for data protections settings by accessing a communications bus of the vehicle (e.g., via an OBD II port and connector, or any other suitable port or interface) and accessing diagnostic code information. For example, a diagnostics manager may generate signals on a communications bus, which may be accessed by a diagnostics tool to identify a diagnostic code indicator. In a further example, a diagnostic tool may interact with a communications bus (e.g., managed by a diagnostic manager to which each ECU transmits diagnostic information), rather than communicating directly and separately with each ECU (e.g., diagnostic management may be distributed or centralized). In some embodiments, each ECU may be coupled to the communications bus and may transmit signals indicative of diagnostic codes (e.g., statuses, data, indicators) via the communications bus (e.g., to a central controller or a diagnostic interface). In some embodiments, each ECU may provide diagnostic code information (e.g., statues, data, indicators) to a diagnostic manager (e.g., which may be central ECU, distributed among ECUs, or a combination thereof), which may provide signals indicative of diagnostic codes via the communications bus.

FIG. 1 shows a side view of illustrative vehicle 100 having controllers 110, 120, 130, and 140 and interface 111, in accordance with some embodiments of the present disclosure. For example, each of controllers 110, 120, 130, and 140 may correspond to a particular subsystem (e.g., a battery system, a motor control system, a cabin air system, a cooling system, a suspension system, an autonomous vehicle system, a user interface), a combination of subsystems, or a central controller (e.g., that communicates with and manages other controllers). Each of controllers 110, 120, 130, and 140 may be configured to check for errors, and in response to identifying an error, generate an error flag, trouble code, or any other suitable indicator or combination of indicators. In an illustrative example, each of controllers 110, 120, 130, and 140 may be coupled to a communications bus (e.g., a CAN bus) and may be configured to generate messages and address signals over the bus. In a further example, controller 110 may be a central controller configured to communicate with controllers 120, 130, and 140, which may be configured to transmit error information to controller 110. In turn, controller 110 may generate one or more error flags, trouble codes, or any other suitable indicators or combination of indicators (e.g., and transmit the indicator via a communications bus, store in memory, or otherwise memorialize the error).

To illustrate, vehicle 100 (e.g., a salable vehicle) or otherwise systems thereof may be configured to ensure that data protection settings are enabled on every ECU. Manually checking each part or ECU is time intensive, and may be prone to human error. Locking every ECU at the manufacturer may be effective, but might rely too heavily on the manufacturer. For example, building unlocked parts for developers to use and modify may introduce a risk of developer units getting shipped or otherwise used in commerce. In some embodiments, the present disclosure is directed to vehicles (e.g., vehicle 100) or otherwise systems and embedded software configured to cause the ECU's firmware to check the configuration of the processor on which it is operating.

In some embodiments, the firmware may be configured to check the configuration of the processor (e.g., without further software being uploaded). If the appropriate data protections are not enabled (e.g., the JTAG lock and flash readout protections are not enabled), the vehicles may set a diagnostic code status that will illuminate a Malfunction Indicator Lamp (MIL) of the vehicle. The methods and systems of the present disclosure may provide an effective, cost effective, and automated check of each ECU's protection settings. For example, vehicle 100 may be configured to identify or otherwise respond to the following scenarios:

1) ECU has no firmware (e.g., firmware has not been loaded, or has been removed), and is unlocked: ECU will not function, other ECUs will set "communication lost" diagnostic codes for it, ECU may be replaced with a compliant part.
2) ECU has firmware and is unlocked: ECU will set a diagnostic code status on boot-up and illuminate the MIL. A diagnostic tool (e.g., at the manufacturing plant) will read the diagnostic code statuses (e.g., DTC statuses), as a vehicle with the MIL activated cannot be sold or otherwise warrants further investigation. For example, the ECU may be identified as defective and replaced.
3) ECU has firmware and is locked: ECU will function, and the system will not set a diagnostic code indicator, and the MIL will not illuminate. This is the desired scenario, and no further action need be taken to diagnose data protections.

The methods and systems of the present disclosure allow data protection settings to be confirmed without placing additional burden on the plant to manually perform time-intensive checks or forcing complete trust in manufacturers, developers, or other users/entities.

Figure 2:
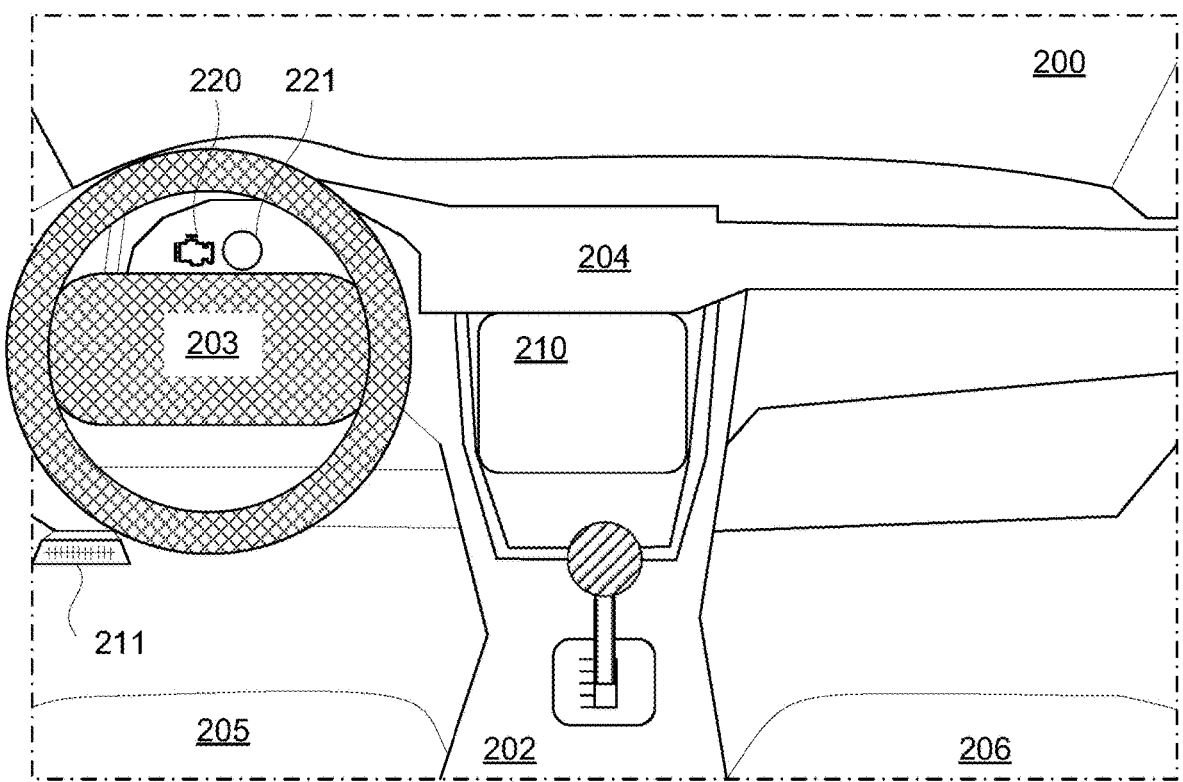
FIG. 2 shows an illustrative vehicle interior having indicators and interfaces, in accordance with some embodiments of the present disclosure.

FIG. 2 shows illustrative vehicle interior 200 having indicators 220-221 and interfaces 210-211, in accordance with some embodiments of the present disclosure. Vehicle interior 200 may correspond to an interior of vehicle 100 of FIG. 1, for example. As illustrated, seats 205 and 206, center console 202 (e.g., having a shifter), steering wheel 203, indicators 220-221 and interfaces 210-211 are arranged in or accessible from vehicle interior 200.

Indicator 220 corresponds to an existing dash warning indicator. For example, indicator 220 may correspond to a "check engine" light, a "battery" light, a "warning" light, an "oil change" light, any other suitable warning indicator corresponding to an aspect of operation, or any combination thereof (e.g., indicator 220 may correspond to all of or a subset of warning lights being on). Indicator 221 corresponds to a dedicated dash warning indicator for protection status (e.g., a read/write protection status). For example, indicator 221 may be a color LED, an icon having a particular shape or visual appearance, any other suitable dash indicator, or any combination thereof.

In some embodiments, as illustrated, interface 210 corresponds to a touchscreen mounted in dash console 204. For example, interface 210 may be configured to display images, text, icons, soft buttons, any other suitable graphics, or any combination thereof, and may be configured to receive haptic input from a user pressing areas of the screen. In some embodiments, interface 210 may include one or more hard buttons, LEDs, sliders, switches, speakers, microphones, any other suitable components, or any combination thereof, with which a user may interact (e.g., receive information or provide information). In some embodiments, a user device such as a mobile phone (e.g., a smart phone) may be used as interface 210 (e.g., by communicating with one or more controllers of the vehicle).

Interface 211 corresponds to an On-Board Diagnostic (OBD) port, such as an OBD-II port. For example, interface 211 may include an OBD-II port having a connector with sixteen (16) pins (e.g., as set forth in SAE J1962). In a further example, interface 211 may include an OBD-II port having a SAE J1850 bus (e.g., positive and negative), CAN bus (e.g., high and low), chassis ground, signal ground, 12 VDC (e.g., from a battery of the vehicle), ISO 9141-2 bus (e.g., L and K lines), any other suitable pin designations, or any combination thereof. In some embodiments, interface 211 includes any suitable connector or transmitter for communicating diagnostic trouble codes.

In an illustrative example, vehicle 100 may be manufactured (e.g., assembled and tested), and a diagnostic check of controllers 110, 120, 130, and 140 may be performed (e.g., by accessing interface 211 with a testing module, or interface 210 by a user). If any indicators exist corresponding to protection status for one or more of controllers 110, 120, 130, or 140, or any other suitable controller, then one or more responses may be performed (e.g., updating the protecting status, ignoring the indicator, pulling vehicle 100 from the line, or a combination thereof).

Figure 3:
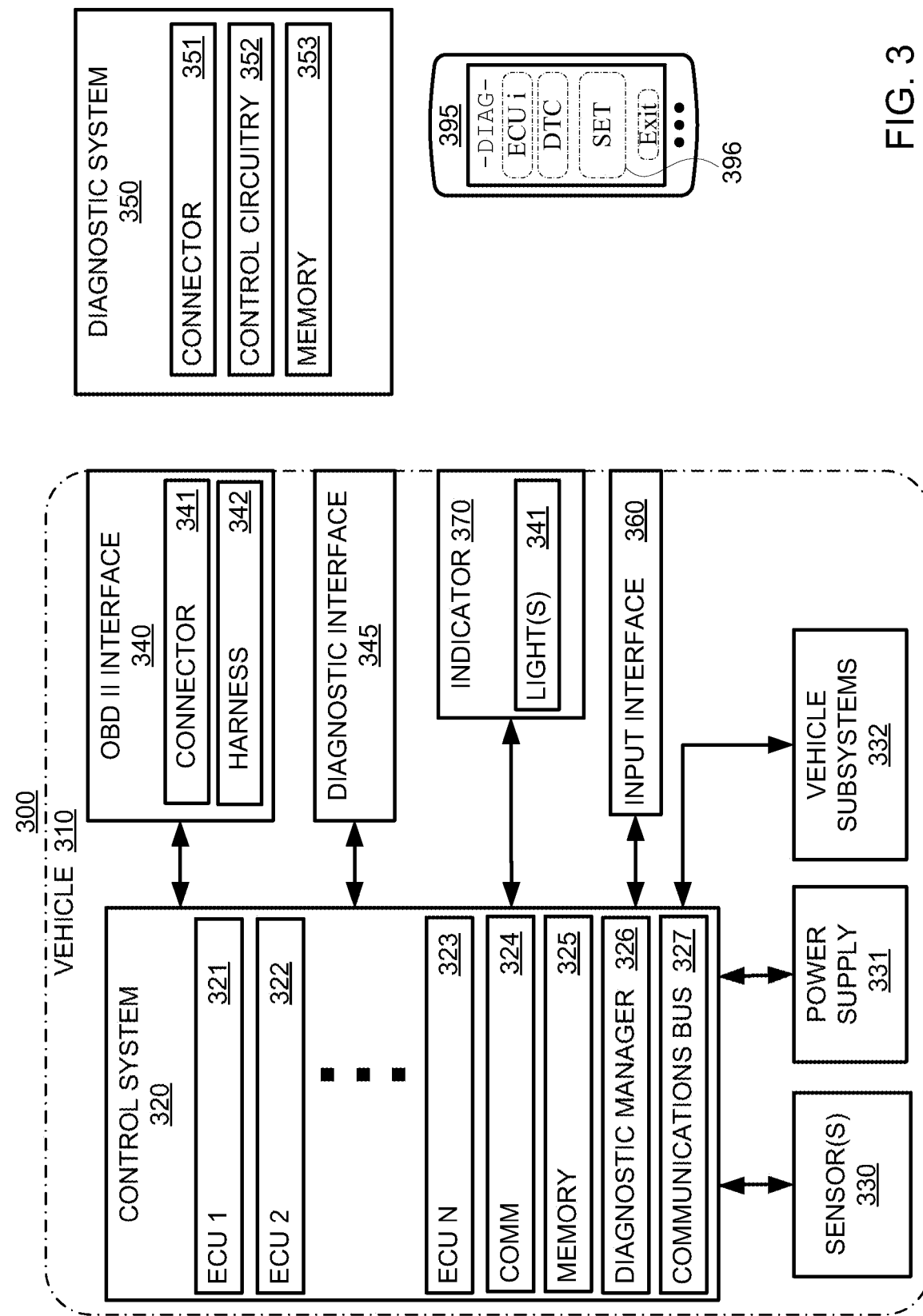
FIG. 3 shows a block diagram of an illustrative system for checking and managing read/write protection settings, in accordance with some embodiments of the present disclosure.

FIG. 3 shows a block diagram of illustrative system 300 for checking and managing read/write protection settings, in accordance with some embodiments of the present disclosure. As illustrated, system 300 includes vehicle 310, diagnostic system 350 and device 395. Vehicle 310, as illustrated, includes control system 320 (e.g., the same as controllers 110, 120, 130, and 140 of FIG. 1), OBD II interface 340 (e.g., the same as interface 111 of FIG. 1, interface 211 of FIG. 2), indicator 370 (e.g., indicators 220 or 221 of FIG. 2), input interface 360, sensors 330, power supply 331, and vehicle subsystems 332. Vehicle 310 may include optional diagnostic interface 345, which may include a diagnostic port other than an OBD II port. For example, optional diagnostic interface 345 may be, but need not be, included in vehicle 310 if vehicle 310 includes OBD II interface 340.

Control system 320, as illustrated, includes ECUs 321-323 (e.g., a total of N ECUs), memory 325, communications interface 324 (comm 324), communications bus 327, and optionally diagnostic manager 326. Each of ECUs 321, 322, and 323 (and any other suitable ECUs of vehicle 310) may include control circuitry, which may include a processor, a communications bus, memory, power management circuitry, a power supply, any suitable components, or any combination thereof. Memory 325 may include solid state memory, a hard disk, removable media, any other suitable memory hardware, or any combination thereof. In some embodiments, memory 325 is non-transitory computer readable media configured to store computer instructions that, when executed, perform at least some steps of any of process 400, process 500, or process 600 described in the context of FIGS. 4-6. In some embodiments, instructions are preprogrammed into each of ECUs 321-323 (e.g., each may include memory, or memory 325 may be distributed among ECUs 321-323), for performing diagnostics, managing diagnostic codes, or a combination thereof. In some embodiments, the instructions are loaded or otherwise provided to ECUs 321-323 (e.g., as firmware) to perform diagnostics (e.g., a self-diagnosis), manage diagnostic codes, or a combination thereof. To illustrate, for example, each of ECUs 321-323 may include installed firmware for performing one or more diagnostic checks or otherwise managing one or more diagnostic codes. In another illustrative example, firmware may be loaded into memory of any or all of ECUs 321-323 check, and flag, data protections settings.

Control system 320 may include an antenna and other control circuitry, or any combination thereof, and may be configured to access the internet, a local area network, a wide area network, a Bluetooth-enable device, an NFC-enabled device, any other suitable device using any suitable protocol, or any combination thereof. In some embodiments, control system 320 includes or otherwise is coupled to input interface 360, which may include, for example, a screen, a touchscreen, a touch pad, a keypad, one or more hard buttons, one or more soft buttons, a microphone, a speaker, any other suitable components, or any combination thereof. For example, in some embodiments, input interface 360 includes all or part of a dashboard, including displays, dials and gauges (e.g., actual or displayed), soft buttons, indicators, lighting, and other suitable features. In a further example, input interface 360 may include one or more hard buttons arranged at the exterior of the vehicle, interior of the vehicle (e.g., at the dash console), or at a dedicated keypad arranged at any suitable position. In a further example, input interface 360 may be configured to receive input from device 395, haptic input from a user, or both.

Comm 324 may include one or more ports, connectors, input/output (I/O) terminals, cables, wires, a printed circuit board, control circuitry, any other suitable components for communicating with other units, devices, or components, or any combination thereof. In some embodiments, control system 320 (e.g., ECUs 321, 322, and 323 thereof) is configured to control a drivetrain (e.g., control an engine, electric motor, transmission, brake), cooling system, cabin air system, braking system, autonomous control system, steering system, suspension system, control or manage a battery system (e.g., power supply 331), determine status information of the vehicle or components thereof, communicate with other units, perform any other suitable actions, or any combination thereof. In some embodiments, comm 324, input interface 360, or both, may be configured to send and receive wireless information between control system 320 and external devices such as, for example, network devices (e.g., a server, a WiFi access point), device 395 (e.g., a user device such as a smart phone, or a handheld OBD II reader), keyfobs, any other suitable devices, or any combination thereof. In some embodiments, communications bus 327 is integrated with comm 324 (e.g., communicatively coupling ECUs 321-323, OBD II interface 340, diagnostic interface 345, input interface 360). In some embodiments, communications bus 327 may be coupled to comm 324. Communications bus 327 may include or otherwise be coupled to terminals of connector 341 of OBD II interface 340, terminals of diagnostic interface 345, terminals of ECUs 321-323, diagnostic manager 326, any other suitable components, or any combination thereof.

Power supply 331 may include, for example, a vehicle battery pack that may include a plurality of battery cells. For example, power supply 331 may include battery cells, busbars, current collectors, enclosures, DC bus cables or otherwise conductors, contactors, switches, sensors and instrumentation, any other suitable components, or any combination thereof. In a further example, power supply 331 may provide 12 VDC to OBD II interface 340, buses thereof, provide any suitable voltage to any suitable system of vehicle 310 (e.g., control system 320, vehicle subsystems 332).

As illustrated, device 395 includes four soft buttons 396, each corresponding to a particular function associated with diagnostics for vehicle 310. When one of soft buttons 396 is selected, control circuitry of device 395 may receive a signal that corresponds to the button press (e.g., from an electrical switch or sensor coupled to the button), and in response generate a message or otherwise signal for transmitting to a communications interface of vehicle 310 (e.g., comm 324). In an illustrative example, the user may select an application implemented on device 395 to manage indications generated by control system 320. As illustrated, soft buttons 396 include a "ECI i" button (e.g., to identify an indexed ECU), a "DTC" button (e.g., to identify indications corresponding to the selected ECI i), and a "SET" button to set or reset an indicator or flag corresponding to ECU i, to provide respective commands to control system 320. In some embodiments, any of soft buttons 396 or functionality of device 395 may be implemented using input interface 360, control system 320, or a combination thereof. For example, a user may manage indications at input interface 360 of vehicle 310 rather than on a separate user device (e.g., device 395).

Diagnostic system 350 may be an OBD II reader, a standalone testing station, or otherwise a computing system for receiving and processing information from vehicle 310. As illustrated, diagnostic system 350 includes connector 351, control circuitry 352, and memory 353. For example, connector 351 of diagnostic system 350 may be connected to connector 341 (e.g., by plugging the mating connectors together to engage electrical pins). In some embodiments, diagnostic system 350 is a handheld device. In some embodiments, diagnostic system 350 may be or include a module configured to plug into connector 341 and transmit wireless or wired signals to remote processing equipment (e.g., of a network device or device 395). In some embodiments, diagnostic system 350 may be a module of processing equipment. Control circuitry 352 may be configured to process signals from OBD II interface 340 to, for example, determine one or more diagnostic code statuses, error flags, diagnostic code information, any other suitable information, or any combination thereof. For example, control circuitry 352 may interface to communications bus 327 via OBD II interface 340, and may be configured to identify one or more codes of the form "*wxyz" where "*" represents a letter and "w," "x," "y," and "z" each represent a number from zero to nine (e.g., a DTC may be U1 100 or U3322). In an illustrative example, referencing a DTC-based system, a DTC may include five characters, wherein the first indicates a type of code, the second indicates a global code, the third indicates a subsystem or component, and the fourth and fifth indicate a particular error (e.g., "yz" may correspond to a read/write protection error or data protection disablement).

Indicator 370 may include one or more malfunction indicator lights (MILs), LEDs, icons, domain-specific indicator on a console, or a combination thereof configured to provide an indication of a state, flag, or error.

Diagnostic interface 345 may be included instead of, or in addition to OBD II interface 340. For example, a vehicle may include an OBD II interface as well as some other interface for transmitting information, receiving information, receiving user inputs, providing output to a user or system, any other suitable functionality, or any combination thereof. For example, diagnostics interface 345 may include a port or connector of one or more ECUs (e.g., ECUs 321-323) which may be coupled to a communications bus. In a further example, diagnostics interface 345 may include a wireless interface which may be coupled to a communications network.

In an illustrative example, vehicle 310 may include an on-board diagnostic system that includes diagnostic manager 326 and OBD II interface 340. Diagnostic manager 326 may be associated with control circuitry of a particular ECU (e.g., ECU 321), distributed among ECUs (e.g., ECUs 321-323, connected by a communications bus), a separate controller, any other suitable control circuitry, or any combination thereof. In some embodiments, diagnostic manager 326 may be configured to debounce diagnostic code indicators, set diagnostic code indicators, receive or set diagnostic code statuses, clear diagnostic code statuses, provide diagnostic code data (e.g., limited data, extended data, or both), read a diagnostic code status or indicator, clear a diagnostic code status or indicator, store a diagnostic code status or indicator, any other suitable function, or any combination thereof. In some embodiments, an ECU is configured to store information for a plurality diagnostic codes (e.g., a list of DTCs for which the ECU can perform diagnostic checks) including, for example, status information (e.g., pass, failed, pending, confirmed, not tested, warnings/indicators). In some embodiments, each ECU (e.g., of ECUs 321-323) may perform a local diagnostic test (e.g., local to the respective ECU, for a predetermined list of diagnostic codes that correspond to the ECU), checking for errors corresponding to each of the particular diagnostic codes (e.g., or a subset thereof). For each diagnostic code of the list or a subset thereof, the ECU (e.g., or diagnostic manager 326) may determine status information and transmit the status information, data, warnings, or a combination thereof to OBD II interface 340, diagnostic interface 345, input interface 360, indicator 370, memory 325, or a combination thereof. In some embodiments, diagnostic manager 326 (e.g., any or all of ECUs 321-323) may include an encoder, or other logical instructions, circuitry, or both to generate an indication of the diagnostic codes on a communications bus. For example, if a status corresponding to one or more diagnostic codes corresponds to data protections being disabled, diagnostic manager 326 may use a level shifter or other circuitry to generate signals on a CAN bus or other suitable communications bus that may be accessed by a diagnostic tool.

Figure 4:
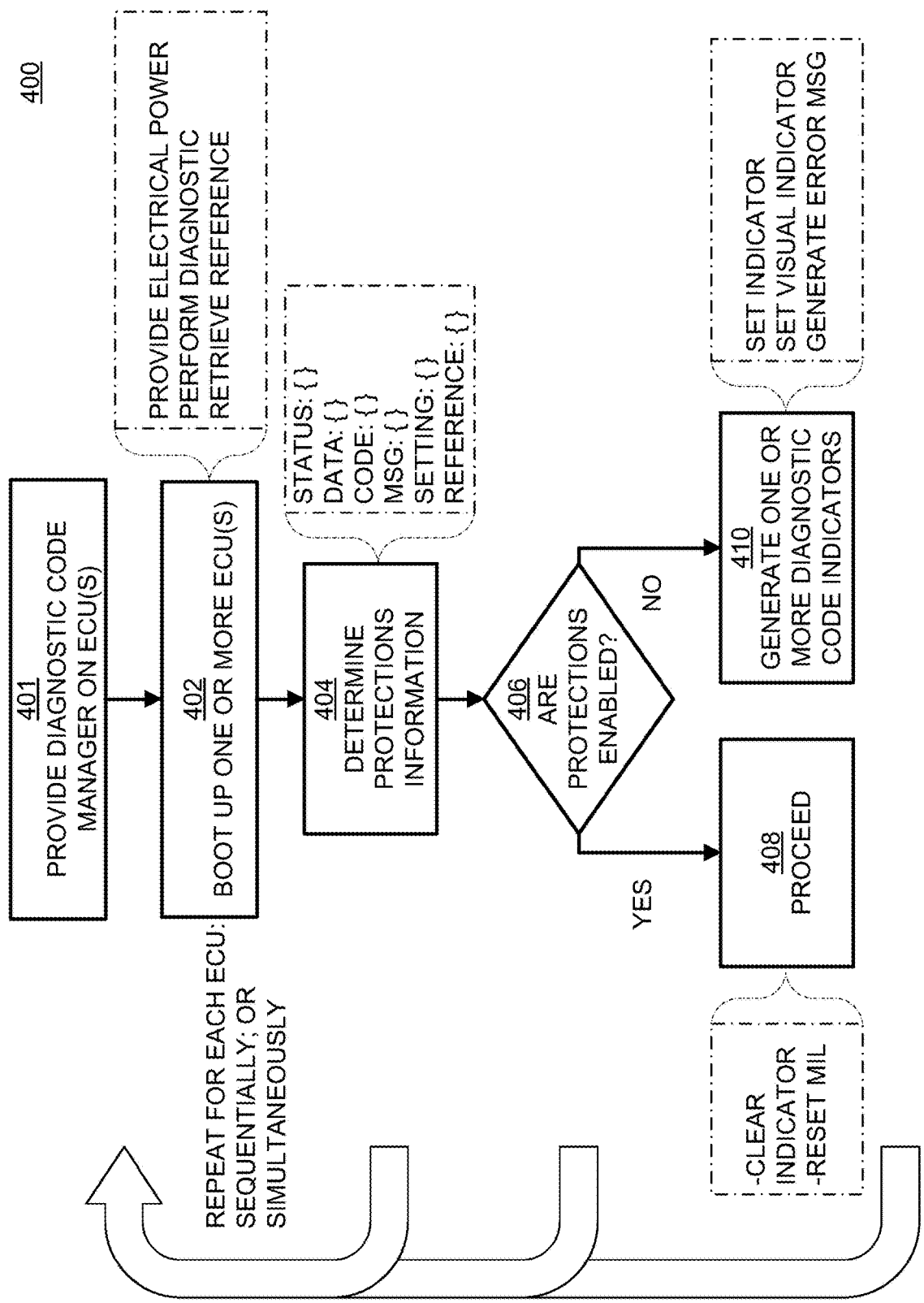
FIG. 4 is a flowchart of an illustrative process for checking and managing read/write protection settings, in accordance with some embodiments of the present disclosure.

FIG. 4 is a flowchart of illustrative process 400 for checking and managing read/write protection settings, in accordance with some embodiments of the present disclosure. In an illustrative example, process 400 may be performed by system 300 of FIG. 3. In a further example, control system 320 of FIG. 3 may perform some steps of process 400 (e.g., steps 402 and 404 only, or any of steps 402-410), and diagnostic system 350 may perform some steps of process 400 (e.g., any of steps 406-410). In some embodiments, each ECU of a vehicle may perform process 400 or a subset of steps thereof.

Step 401 includes providing for installation of the diagnostic code manager software or firmware (e.g., diagnostic manager 326 such as a DTC manager) on one or more electronic control units. For example, diagnostic instructions may be provided to an ECU and may be configured to execute prior to operation of the vehicle. The installation may occur by providing the diagnostic code managers to a third-party for installation during manufacturing the ECU via JTAG or other suitable protocol, or the installation may occur at the vehicle manufacturing plant via a bootloader. In some embodiments, for example, an ECU may include one or more layers of functionality, of which some or all may be read/write protected. For example, an ECU may include firmware having instructions for operation (e.g., set from a factory, or otherwise not intended for subsequent access or otherwise frequent access), and application-level software that is intended to be read, written, modified, or otherwise accessed after installation. Examples of software that might be intended for access may include clock settings (e.g., which may be updated or modified), sensor signals (e.g., to read a temperature), identifying information (e.g., calibration information, serial numbers, model numbers, user information), selectable or modifiable options, stored data (e.g., available for reading), network or communications settings, or any other suitable software. Accordingly, in some embodiments, the systems and methods of the present disclosure are directed to protection settings corresponding to firmware and need not be directed to application-level aspects of software or firmware of an ECU.

In some embodiments, step 402 may include booting up some or all of the one or more ECUs of step 401, for example, by applying electric power to the one or more ECUs. For example, a system includes at least one ECU, and may include a plurality of ECUs coupled to a communications bus. To illustrate, a system may include a plurality of ECUs, of which at least one includes a diagnostic code manager (e.g., stored diagnostic instructions) or otherwise software or firmware for generating diagnostic code indicators. In some embodiments, for example, at step 402, a user may turn a key (e.g., to an ON, START, or ACCESSORY position), press ON or START button, connect one or more battery terminals, achieve a throw position of one or more switches (e.g., from OFF to ON), provide a signal to one or more relays, or a combination thereof. In a further example, step 402 may include automatically applying power to the one or more ECUs by transmitting a signal to comm 324 or input interface 360 (e.g., which may be configured to always be powered or otherwise of receiving and processing signals). In some embodiments, upon boot-up, an ECU may fail to boot if any adverse data protection settings are detected (e.g., corresponding to disabled or otherwise not enabled protections). For example, a bit setting or a fuse setting may be set based on a boot-up routine (e.g., stored computer instructions executed at start-up, and the boot process may be ceased or otherwise altered based on the bit setting or fuse setting. In some embodiments, aspects of step 402 may be performed subsequent to boot up. For example, after booting, while powered, the system may perform one or more diagnostic checks.

Step 404 includes determining protections information for the one or more ECUs. In some embodiments, following boot-up, each ECU may perform a diagnostic test or check to determine any outstanding diagnostic codes (e.g., such as DTC statuses not corresponding to protected data) or other errors. For each ECU, if the ECU determines that one or more diagnostic code has not passed the diagnostic check or is otherwise confirmed as failed, undeterminable, not tested, pending, associated with a warning, any other status corresponding to not cleared or passed, or any combination thereof, then the ECU may set a status (e.g., a status flag) for each of the one or more diagnostic codes. For example, each ECU may execute instructions stored in memory (e.g., diagnostic instructions stored in firmware) to check for non-cleared diagnostic codes, or all diagnostic codes, and generate a status flag (e.g., pass, fail, pending, confirmed, not tested, warning, or other suitable status), which may be stored in memory of the ECU and/or transmitted to other ECUs via a communications bus. In some embodiments, a central controller (e.g., a particular ECU) may generate and transmit signals to other ECUs to perform the diagnostic check, analyze one or more particular diagnostic codes or error states, respond with a status report (e.g., via the communications bus), perform any other suitable function, or any combination thereof. To illustrate, step 404 may include determining a status, determining a setting, determining a code, determining a message, retrieving or otherwise accessing a reference, aggregating or otherwise preparing data, or any combination thereof. In some embodiments, step 404 and 402 may be combined as, for example, a set of computer instructions (e.g., of a diagnostic code manager, or other suitable diagnostic instructions) for booting that includes performing diagnostic checks and setting statuses, flags, or other indications of unprotected data settings.

In some embodiments, step 404 may include determining data protection settings that may include a read protection setting, write protection setting, another suitable security setting, or a combination thereof. In some embodiments, step 404 may include determining at least one firmware protection status such as, for example, a debugging status (e.g., a status indicated at a Joint Test Action Group (JTAG) test access port corresponding to one or more registers, or otherwise indicated by a serial wire debug port), a flash readout protection status, a bit setting (e.g., configured to protect, gate, or disable suitable ECU functionality), a fuse setting (e.g., configured to protect, gate, or disable suitable ECU functionality), or a combination thereof. In some embodiments, step 404 may include determining whether contents of the one or more ECU's program memory or non-volatile memory are protected. To illustrate, step 404 may include performing a diagnostic check based on stored diagnostic instructions configured to execute at a suitable time (e.g., prior to operation of the vehicle).

Step 406 includes determining whether data protections are enabled for the one or more ECUs. For example, the system may determine whether data protections are enabled based on step 404. Based on the status, setting, code, message, referencing information, data, or a combination thereof of step 404, the system may identity one or more data protection setting that does not correspond to protections being enabled. For example, if one or more statuses corresponding to one or more diagnostic codes determined at step 404 (e.g., pass, fail, pending, confirmed, not tested, warning, or other suitable status) do not correspond to passing or cleared, then the system may determine that a data protection setting is not enabled. To illustrate, if the system determines a status of "warning" or "fail" at step 404 then the system may determine at step 406 that data protections are not enabled (e.g., and proceed to step 410). In a further example, if the system determines a status of "pass" at step 404 then the system may determine at step 406 that data protections are enabled (e.g., and proceed to step 408). The system may determine a status for each diagnostic code, which may be updated or cleared, and accordingly generate the diagnostic code indicator if the status corresponds to data protections being unprotected (e.g., or not confirmed as protected). In an illustrative example, step 404, step 406, or a combination thereof (e.g., steps 404 and 406 may be combined as a single step) may include determining whether at least ECU includes firmware, and determining whether the at least one ECU is unlocked for reading and writing.

Step 408 includes proceeding from confirming data protection settings (e.g., to subsequent boot-up processes, ECU operation) if it is determined at step 406 that protections are enabled or otherwise sufficient. In some embodiments, at step 408, the system may determine to clear a diagnostic code indicator, reset a diagnostic code indicator, not to activate or otherwise deactivate a MIL, reset a MIL, any other suitable determination, or any combination thereof. In some embodiment, one or more boot-up or subsequent processes may depend on a cleared or "enabled" state of data protection settings as determined at step 406. In some embodiments, step 408 need not be included or otherwise includes doing nothing further (e.g., as data protection settings are enabled).

Step 410 includes generating the one or more diagnostic code indicators, if it is determined at step 406 that protections are not enabled (e.g., disabled) or otherwise insufficient. In some embodiments, generating the diagnostic code indicator includes either or both of (i) transmitting the diagnostic code indicator to a diagnostic port of the vehicle (e.g., diagnostic interface 345 and/or OBD II interface 340 of FIG. 3), and (ii) linking the diagnostic code indicator to malfunction indicator lamp (MIL) arranged at a console of the vehicle and causing the MIL to illuminate. In some embodiments, generating the one or more diagnostic code indicators includes maintaining (e.g., not clearing) a diagnostic code indicator (e.g., based on a status of "failed" or "warning"). In some embodiments, generating the one or more diagnostic code indicators includes storing the one or more indicators (e.g., one or more DTC indicators) in memory, outputting the one or more indicators (e.g., one or more DTC indicators) to a communications bus, or both. In some embodiments, step 410 includes setting a diagnostic code status and communicating the diagnostic code status to a communications bus.

In an illustrative example, the system may determine at least one firmware protection status of at least one ECU at step 404 by checking a configuration of a processor of the at least one ECU and comparing the configuration to a reference configuration stored in memory. For example, reference information may include a set of states, a set of flags, or otherwise a set of values indicative of a configuration of the ECU. The reference information may include a set of values indicative of whether read protection is enabled (e.g., "1" for enabled and "0" for disabled), write protection is enabled (e.g., "1" for enabled and "0" for disabled), firmware is installed, firmware is up to date, any other suitable state information, or any combination thereof. To illustrate, the ECU may retrieve reference information from memory (e.g., of the ECU, or accessible to the ECU by a communications bus), determine a set of configuration states (e.g., protections being enabled or disabled, firmware being installed or not), and then compare the configuration states to reference states of the reference information at step 404. If any states do not match, the ECU may determine at step 406 that protections are not enabled and proceed to step 410.

In another illustrative example, the system may determine at least one firmware protection status of the at least one ECU at step 404 by determining that the at least ECU does not include firmware and determining that the at least one ECU is unlocked (e.g., against reading and writing). In response, the system may generate an indicator at step 404 or 406 by generating a diagnostic code indicator corresponding to the at least one ECU.

In another illustrative example, the system may determine at least one firmware protection status of at least one ECU at step 404 by determining that the at least ECU includes firmware, and determining that the at least one ECU is unlocked. In response, the system may generate an indicator at step 410 by generating, storing, and/or transmitting a diagnostic code indicator corresponding to the at least one ECU, and causing a malfunction indicator lamp (MIL) to illuminate (e.g., on a dash console or center console) at step 410.

In another illustrative example, the system may determine at least one firmware protection status of at least one ECU at step 404 by determining the at least one ECU includes firmware and determining the at least one ECU is locked. In response, at step 406, the system may determine the at least one firmware protection status corresponds to the at least one ECU being protected (e.g., and proceed to step 408).

In another illustrative example, the system may perform steps 402-406 and the relevant step of 408 or 410 for each ECU sequentially, simultaneously, or a combination thereof. For example, in some embodiments, the system may perform steps 402-404 simultaneously for each ECU, and the aggregate of data protection indicators are considered at step 406. In a further example, in some embodiments, the system may perform steps 402-406 simultaneously for each ECU, and the aggregate of indicators of step 406 and respond at either step 408 or 410 depending upon if there is at least one indicator of a non-enabled data protection setting outstanding. In a further example, in some embodiments, the system may perform steps 402-406 and the relevant of steps 408 or 410 sequentially for each ECU, and any indicator determined at step 406 may update the response at either 408 or 410. To illustrated, the system may perform process 400 for N ECUs sequentially, and if the 1–M ECUs have data protections enabled (e.g., wherein M is an integer less than integer N), if ECU M+1 has disabled protection settings, the system may at step 410 generate a visual indicator and transmit a DTC indicator at that time or afterwards (e.g., while no indicator may have been generated during analysis of the 1–M ECUs). Similarly, if an indicator has been set at step 410, and a subsequently considered ECU also indicates data protections are disabled, the system may maintain the visual indicator, update the diagnostic code indicator, append or otherwise add to the diagnostic code indicator, or a combination thereof.

In a further example, a reference configuration may include a write protection but not a read protection, or a read protection but not a write protection for data of the ECU. Accordingly, at step 404, the system may determine whether the configuration of the ECU matches the reference configuration (e.g., that protections are in place where desired, and protections are disabled where/if desired). In a further example, a reference configuration may include a write and/or read protection of a portion of data of an ECU. To illustrate, an ECU may include a plurality of stored computer instructions, stored data, reference information, firmware, software, functions, modules, hardware, or a combination thereof, of which a portion is intended as being data protected and a portion that is not intended as data protected. Accordingly, at step 404, the system may determine whether the configuration of the ECU and aspects thereof matches the reference configuration of those aspects (e.g., software, firmware, hardware, or portions thereof).

Figure 5:
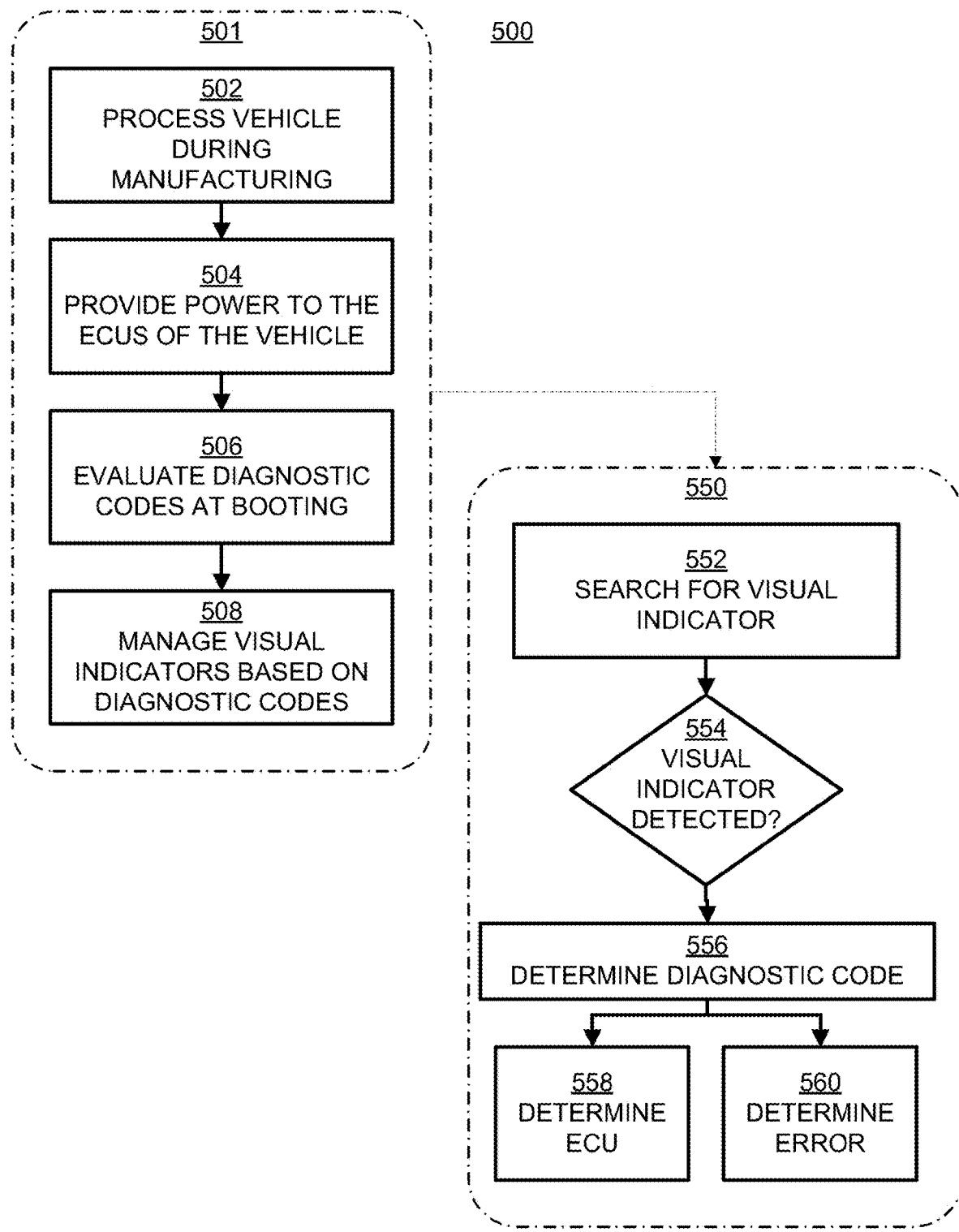
FIG. 5 is a flowchart of an illustrative process for checking a vehicle for data protections, in accordance with some embodiments of the present disclosure.

FIG. 5 is a flowchart of illustrative process 500 for checking a vehicle for data protections, in accordance with some embodiments of the present disclosure. As illustrated, process 500 includes process 501 directed to on-vehicle processes, and process 550 directed to external diagnostic processes. For example, in some embodiments, process 501 may correspond to some or all of process 400 of FIG. 4. In a further example, processes 501 and 550 may be performed sequentially (e.g., process 501 may be followed by process 550).

Step 502 may include processing a vehicle during manufacture. For example, step 502 may include assembling components and systems of the vehicle, installing wiring and harnesses, installing fluid fittings and conduits, installing a battery system, installing interior and exterior features, painting or otherwise finishing the exterior of the vehicle, testing operation of one or more systems of the vehicle, any other suitable processes, or any combination thereof. For example, in some embodiments, step 502 includes a series of processes occurring before a diagnostic check of ECUs of the vehicle. In a further example, step 502 may occur at the end of a manufacturing line, a storage facility, a testing facility, any other suitable location, or any combination thereof.

Step 504 may include providing power to a plurality of ECUs of the vehicle. In some embodiments, step 504 may include applying battery power to the plurality of ECUs of the vehicle. To illustrate, step 504 may be same as or similar to step 402 of process 400 of FIG. 4. In some embodiments, step 504 may include generating and transmitting a control signal to control circuitry of the vehicle to request power be provided to the ECUs. In some embodiments, step 504 may include receiving a button actuation by a user (e.g., a press of a START or ON button), and then closing one or more circuits (e.g., switches, relays, contactors, or other suitable circuit components) to provide the power.

Step 506 may include evaluating one or more diagnostic codes (e.g., determining a status of one or more diagnostic codes) at booting or powering on of the ECUs, or otherwise during operation of the ECUs. To illustrate, step 506 may be same as or similar to steps 402 and 404 of process 400 of FIG. 4. In some embodiments, step 506 includes generating one or more diagnostic code indicators after performing one or more diagnostic tests after receiving power at step 504. For example, at step 506, the system may perform a diagnostic test, which may include, for example, comparing reference information configuration information, scanning for or otherwise generating diagnostic code statuses that do not correspond to "pass," generating one or more diagnostic code indicators to indicate a protection setting that is not enabled, or otherwise determine if any diagnostic codes of a set of diagnostic codes are triggering a warning. For example, for a particular ECU in the context of DTCs, a DTC of "UABCD," where A-D are integers 0-9, may be associated with read protections, and if a status of "failed" or "not tested" is identified, the system may generate a warning status (e.g., the error is not corrected or the test is not performed), which may serve as the DTC indicator. The presence of the diagnostic code indicator is identified by the control circuitry (e.g., of the ECU or another ECU).

Step 508 may include managing visual indicators based on diagnostic codes. To illustrate, step 508 may be same as or similar to step 410 of process 400 of FIG. 4. Control circuitry (e.g., of a central controller or particular ECU, or distributed among ECUs) may determine that one or more diagnostic code indicators is present (e.g., one or more DTCs has an associated warning status or otherwise not "pass" status with respect to data protections), and may determine that one or more visual indicators are to be activated. For example, the control circuitry may map each diagnostic code indicator to a particular MIL, an icon on a touchscreen, any other suitable visual indicator, or any combination thereof. In a further example, the control circuitry may identify one or more diagnostic code indicators corresponding to disabled or otherwise non-enabled data protection settings of the plurality of ECUs, and activate a "CHECK ENGINE" MIL to provide the visual indication that the data protections require further action.

Step 552 may include searching for, or otherwise checking for, visual indicators. In some embodiments, a user or operator may search for visual indicators by examining a dash console (e.g., for an activated MIL), a center console, a user interface, any other visual indicator, or any combination thereof. In some embodiments, step 552 may include searching for the visual indicator on a display generated during process 501 (e.g., displayed on a touchscreen or other suitable interface). To illustrate, a diagnostic test station may be configured and arranged to provide visual access to each vehicle proceeding along a manufacturing line, being arranged in storage, or being retrieved from storage, and step 552 may be performed at the diagnostic test station for each vehicle.

Step 554 may include determining whether any visual indicators are or were detected. If identified, for example, the visual indicator lets the user or operator know that some issue exists with the vehicle (e.g., corresponding to one or more DTC indicators), and that further investigation is needed. If it is determined that no visual indicator is activated or otherwise present, then process 550 may end (e.g., no further investigation or action needed). For example, step 554 may be determination whether the vehicle has "passed" the check or "failed" the check, in which case further action may be required. To illustrate, any vehicle that has failed or otherwise not passed may be subjected to further action before being provided for sale, stored, distributed, or otherwise made available for operation (e.g., by non-development personnel such as the public, a dealership, or in a distribution channel). In some embodiments, at step 554, a flag may be generated in data (e.g., in a database indexed by VIN, serial number, or other vehicle identifier), a visual flag may be generated (e.g., the user may mark the vehicle with a sticker, cone or other item place on the vehicle, or some other identifier), the vehicle may be conveyed or driven to another area for inspection, an inspection may be performed at the test station, or a combination thereof.

Step 556 may include determining at least one diagnostic code that corresponds to the visual indicator. In some embodiments, once the visual indicator is detected, the underlying diagnostic code indicator is determined (e.g., in response). For example, if a MIL is detected as activated at step 554, then the corresponding diagnostic code indicator is determined at step 556. In some embodiments, for example, step 556 includes connecting or otherwise coupling a diagnostic device (e.g., diagnostic system 350 or device 395 of FIG. 3) to a port of the vehicle (e.g., OBD II interface 340) to receive information and determine the diagnostic code indicator. For example, the diagnostic device may identify the diagnostic code associated with the diagnostic code indicator (e.g., such as "U8888" or any suitable indicator), data associated with the diagnostic code associated with the diagnostic code indicator, an ECU associated with the diagnostic code indicator (e.g., based on the DTC), a status (e.g., warning, not tested, confirmed, not confirmed, or not determinable), any other suitable information, or any combination thereof.

Step 558 may include determining or otherwise identifying at least one ECU based on the at least one diagnostic code of step 556. In some embodiments, the diagnostic code indicator itself may provide identifying information and the system may extract the identity of the ECU associated with the diagnostic code. For example, the system may identify one or more bits, one or more letters, digits, or values that correspond to the ECU, or otherwise determine the ECU based on the diagnostic code indicator. In a further example, each ECU may be associated with a list of diagnostic codes that correspond to the ECU (e.g., only some diagnostic codes may be relevant or tested for each ECU), and the diagnostic code itself may be mapped to a particular ECU. In some embodiments, the system may perform steps 556 and 558 simultaneously, and sequentially for each ECU, wherein the system queries each ECU and determines if any diagnostic code indicators are outstanding. In some embodiments, the system may perform steps 556 and 558 simultaneously for each ECU, and the system may identity a set of one or more ECUs that have associated diagnostic code indicators. In some embodiments, the system need not perform step 558, and may, for example, combine step 558 with step 560 or step 554 (e.g., the visual indicator may itself identify the one or more ECUs with associated diagnostic code indicators).

Step 560 may include determining or otherwise identifying at least one error in a data protection setting based on the at least one diagnostic code of step 556. In some embodiments, the system may determine the diagnostic code indicator, map the diagnostic code indicator to a particular error (e.g., "read/write protections disabled") based on reference information (e.g., a database, table, or list of diagnostic codes and corresponding meaning or interpretation). In some embodiments, the system may identify the error as a data protection setting that is not indicative of read/write protections. In some embodiments, the system may retrieve data associated with the diagnostic code indicator, to determine more particularly the error. For example, the system might determine that read protections are enabled but write protections are not, or conversely that write protections are enabled but read protections are not.

In an illustrative example, referencing FIG. 3, vehicle 310 may be manufactured on a manufacturing line (e.g., at step 502), where components are assembly, systems are configured, and otherwise the vehicle is created. During manufacturing, after ECUs (e.g., ECUs 321-323) have been installed and electrically coupled in vehicle 310, a check may be performed before vehicle 310 leaves the manufacturing line (e.g., before being shipped, sold, or otherwise used), corresponding to process 550. For example, while vehicle 310 is on the manufacturing line, diagnostic system 350, device 395, or both may be communicatively coupled to vehicle 310 (e.g., OBD II interface 340 or diagnostic interface 345 thereof) during process 550. In a further example, while vehicle 310 is on the manufacturing line, a user may access input interface 360 of vehicle 310 to perform a diagnostic check during process 550. If, during process 501, one or more diagnostic code indicators are generated at step 506, a MIL is illuminated at step 508, or both, to provide an indicator for step 552 that a data protection setting of ECUs 321-323 may correspond to an unprotected state (e.g., reading or writing may be possible).

In an illustrative example, steps 552 and 554 may be omitted. For example, in some embodiments, a manufacturing step (e.g., step 556) may include connecting an OBD reader or other diagnostic tool to check for diagnostic code indicators at step 556.

Figure 6:
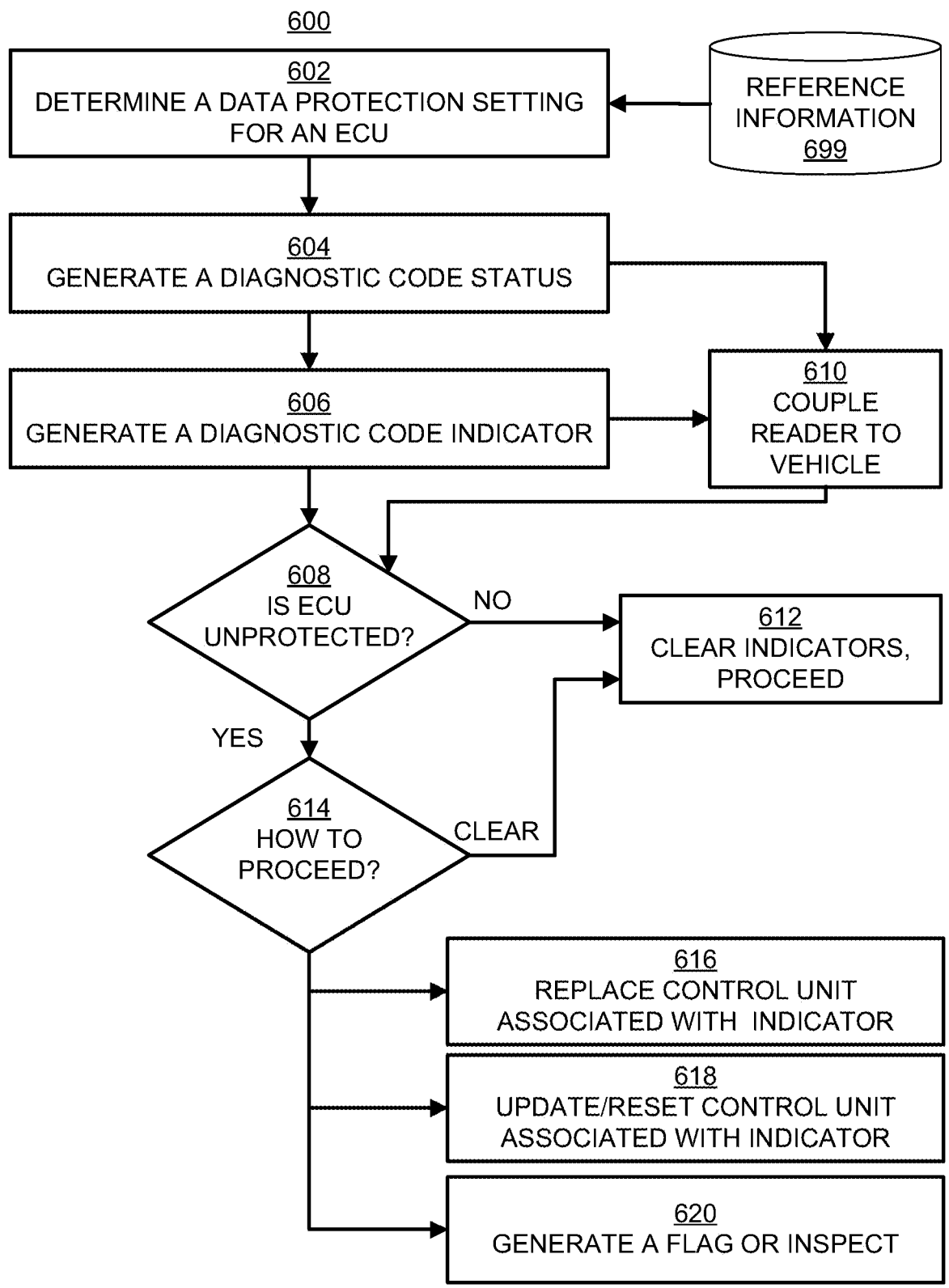
FIG. 6 is a flowchart of an illustrative process for identifying disabled data protections of a vehicle, in accordance with some embodiments of the present disclosure.

FIG. 6 is a flowchart of illustrative process 600 for identifying disabled data protections of a vehicle, in accordance with some embodiments of the present disclosure. To illustrate, process 600 may represent an example of any or all steps of process 400, process 500, or a combination thereof. In a further example, process 600 may be implemented by a combination of the vehicle (e.g., or systems thereof), a diagnostic tool, and a user. In a further example, steps 602, 604, 606, 608, and 614 may be performed by the vehicle, in some embodiments. In a further example, steps 616, 618, and 620 may be performed by a user or operator.

Step 602 may include determining a data protection setting for at least one ECU. In some embodiments, the system may determine the data protection setting based on reference information 699 (e.g., a reference configuration for the at least one ECU). Step 604 may include generating a diagnostic code status based on the results of step 602, for example. Step 606 may include generating a diagnostic code indicator (e.g., a warning, a message stored or transmitted via a communications bus) based on the status. In some embodiments, steps 604 and 606 may be combined or otherwise performed in concert. Step 608 may include determining whether the ECU is unprotected (e.g., any of the diagnostic code indicators, diagnostic code statuses, or combination thereof, correspond to a lack of data protections). Step 610 may include coupling a reader to the vehicle (e.g., coupling diagnostic system 350 of FIG. 3). Step 614 may include determining how to proceed in view of the data protection settings. For example, the system may proceed to any of steps 616-620 (e.g., based on a database, or other reference that maps response to diagnostic code indicator), to step 612 (e.g., if data protections are not disabled), any other suitable steps (not shown), or any combination thereof. Step 616 may include replacing an ECU with a new ECU. Step 618 may include updating or resetting an ECU associated with the diagnostic code indicator. Step 620 may include generating a flag (e.g., stored in data, or as a visible flag for a user), inspecting the vehicle, or a combination thereof.

Step 612 may include clearing diagnostic code indicators, diagnostic code statuses, or both, or otherwise proceeding in spite of the diagnostic code indicators or diagnostic code statuses. For example, if one or more diagnostic code indicators exist but do not correspond to data protections, then some other investigation or process (not shown) may be initiated.

Figure 7:
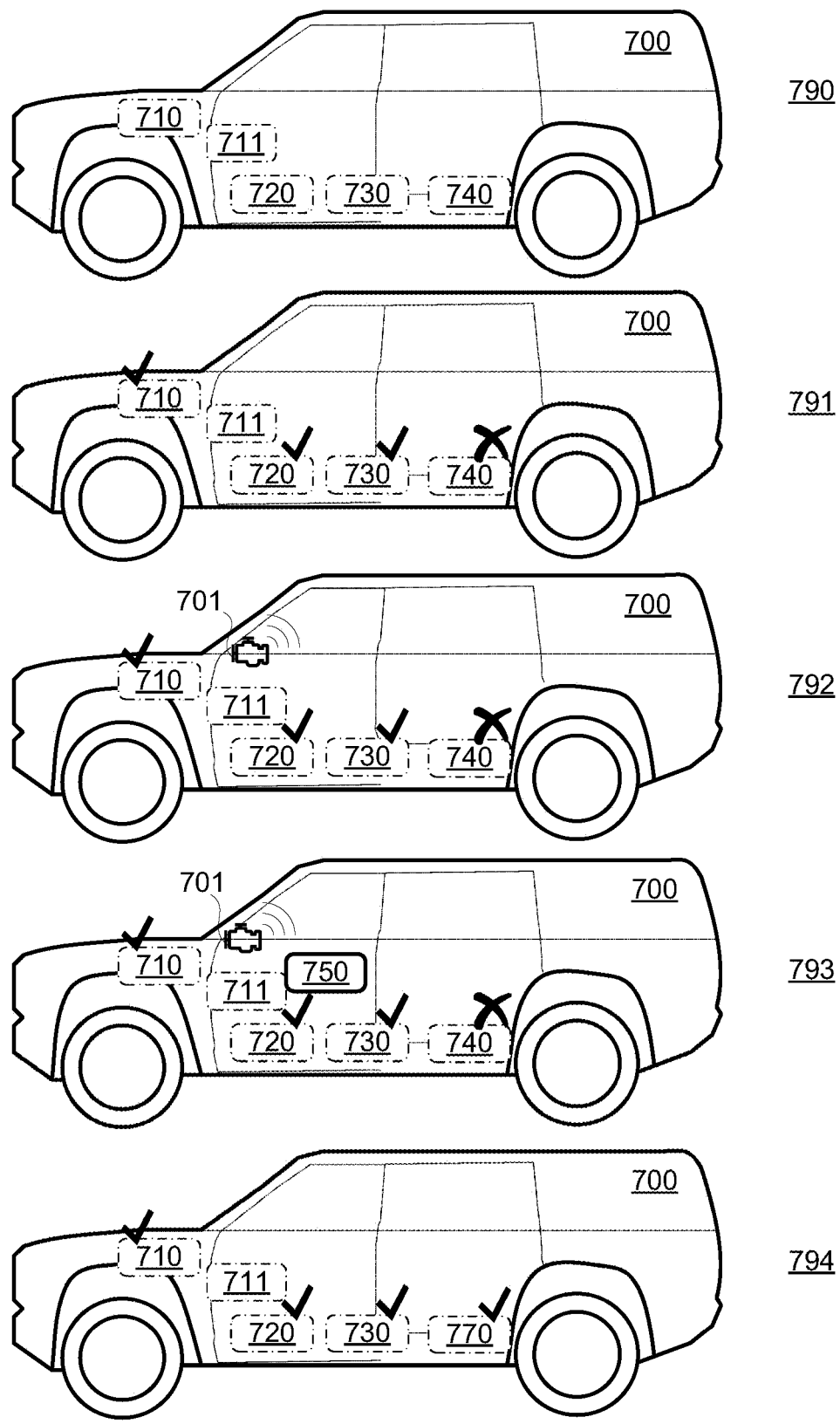
FIG. 7 is a block diagram of an illustrative process for checking for data protections errors of a vehicle, in accordance with some embodiments of the present disclosure.

FIG. 7 is a block diagram of an illustrative process for checking for data protections errors of vehicle 700, in accordance with some embodiments of the present disclosure. Vehicle 700, which is the same as or similar to vehicle 100 of FIG. 1, includes ECUs 710, 720, 730, and 740, interface 711, and indicator 701, in accordance with some embodiments of the present disclosure. For example, each of ECUs 710, 720, 730, and 740 may correspond to a particular subsystem (e.g., a battery system, a motor control system, a cabin air system, a cooling system, a suspension system, an autonomous vehicle system, a user interface), a combination of subsystems, a component, or a central controller (e.g., that communicates with and manages other controllers). Each of ECUs 710, 720, 730, and 740 may be configured to check for a data protection setting or errors thereof, and in response to identifying an error, generate an error flag, diagnostic code indicator, or any other suitable indicator or combination of indicators. In an illustrative example, each of ECUs 710, 720, 730, and 740 may be coupled to a communications bus (e.g., a CAN bus) and may be configured to generate messages and address signals over the bus. In a further example, ECU 710 may be a central controller configured to communicate with ECUs 720, 730, and 740, which may be configured to transmit error information to ECU 710. In turn, ECU 710 may generate one or more error flags, diagnostic code indicators, or any other suitable indicators or combination of indicators (e.g., and transmit the indicator via a communications bus, store in memory, or otherwise memorialize the error). In an illustrative example, FIG. 7 provides an example of some or all of process 400 of FIG. 4, processes 501 and 550 of FIG. 5, and process 600 of FIG. 6.

Panel 790 illustrates vehicle 700 in an assembled state, for example, corresponding to a finished or near finished assembly ready for diagnostics. For example, vehicle 700 may include a plurality of subsystems such as a cooling system, a battery system, a braking system, a steering system, a user interface system, an autonomous driving system, a sensor system, an audio system, a cabin air system, a power train system (e.g., a motor control system), a charging management system, a diagnostic system, any other suitable systems, or a combination thereof. Each system or subsystem of vehicle 700 may be associated with one or more ECUs. Similarly, each ECU of vehicle 700 may be dedicated to, control aspects of, control components of, control operation of, or otherwise be associated with one or more systems or subsystems of vehicle 700. Each of ECUs 710, 720, 730, and 740 may include firmware for performing diagnostics, managing one or more diagnostic codes, or a combination thereof (e.g., which may be installed before the ECUs are installed in vehicle 700).

Panel 791 illustrates vehicle 700, under powered conditions, allowing each ECU (e.g., ECUs 710, 720, 730, and 740) to boot and perform a self-diagnostic, for example. In the illustrated circumstance, ECU 740 has generated a diagnostic code indicator, indicating a data protection setting corresponding to an unprotected state. For example, a read protection, a write protection, or a combination thereof of firmware of ECU 740 may be disabled, not enabled, indeterminable, or otherwise not be indicative of a protected state. For example, panel 791 may correspond to a condition of vehicle 700 shortly after providing power to ECUs 710, 720, 730, and 740 (e.g., by pressing an ON button, pressing an ACCESSORY button, making a power state selection), and after each of ECUs 710, 720, 730, and 740, or other suitable control circuitry (e.g., diagnostic manager 326 of FIG. 3), have performed a diagnostic test. In some embodiments, if one or more ECUs indicates a diagnostic code issue has been confirmed and has generated a diagnostic code warning, the respective ECU may generate and transmit the diagnostic code indicator to a communications bus, central controller, memory device, an interface, or a combination thereof. To illustrate, the character "✓" (a "check" mark) corresponds to a passed diagnostic, while the character "X" corresponds to a failed or otherwise non-determinative diagnostic.

Panel 792 illustrates vehicle 700, under powered conditions, after each ECU (e.g., ECUs 710, 720, 730, and 740) has booted and performed a self-diagnostic, and after a visual indicator is generated indicative of the diagnostic code indicator. As illustrated, indicator 701 is providing a visual indication that at least one diagnostic code issue exists (e.g., is confirmed, outstanding, of unknown status, or otherwise a diagnostic code warning has been generated). Indicator 701 may include, for example, a MIL configured to illuminate as control by control circuitry. For example, vehicle 700 may include an array of MILs (e.g., corresponding to various icons, shapes, or text), graphics and/or text arranged in regions of a display (e.g., areas of interface 210 of FIG. 2, or input interface 360 of FIG. 3), one or more indicators dedicated to data protection settings, any other suitable component and functionality for providing a visual indication, or any combination thereof.

Panel 793 illustrates vehicle 700, under powered conditions, after a visual indicator has been generated and recognized, and diagnostic tool 750 has been coupled to vehicle 700 (e.g., via interface 711) to determine further data protection information. Diagnostic tool 750 may be configured to interface to interface 111 of FIG. 1 or interface 211 of FIG. 2, be the same as or similar to diagnostic system 350 of FIG. 3 or device 395 of FIG. 3, or a combination thereof. For example, after searching for, or otherwise identifying, the visual indication provided by indicator 701 (e.g., from panel 792), diagnostic tool 750 may be installed in vehicle 700, connected to interface 711, coupled to interface 711, communicatively coupled to any of ECUs 710, 720, 730, and 740, or a combination thereof. To illustrate, panel 793 may represent step 556, 558, and 560 of process 550 of FIG. 5, wherein diagnostic tool 750 is used to determine further information.

Panel 794 illustrates vehicle 700 after ECU 740 has been replaced by ECU 770, in response to a diagnostic code indicator being generated by ECU 740 (e.g., as illustrated in panels 791-793). Based on the nature of the diagnostic code indicator associated with ECU 740, ECU 740 may be determined to be not read/write protected, and ECU 770, which may be confirmed as being read/write protected, may be installed to replace ECU 740 (e.g., which may be removed from vehicle 700). After replacement of ECU 740 by ECU 770, vehicle 700 may be recharacterized (e.g., repeat one or more steps of processes 400, 501, 550, or 600, corresponding to returning to panel 790 or panel 791).

In an illustrative example, vehicle 310 (e.g., control system 320 thereof) may be configured to determine a plurality of firmware protection statuses of a plurality of ECUs (e.g., ECUs 321-323) at step 404 of process 400, step 506 of process 501, step 602 of process 600, or as illustrated in panel 791 of FIG. 7. Vehicle 310 (e.g., control system 320 thereof) may also be configured to generate an indicator if the at least one firmware protection status of the plurality of ECUs is unprotected, at step 410 of process 400, step 506 of process 501, or step 606 of process 600. Vehicle 310 (e.g., control system 320 thereof) may also be configured to transmit, using a communications bus, the indicator to an output device configured to generate an output indicative of the indicator at step 410 of process 400, step 508 of process 501, step 606 of process 600, or as illustrated in panels 792-793 of FIG. 7. In some embodiments, vehicle 310 (e.g., control system 320 thereof) determines the at least one firmware protection status of the at least one ECU by (i) checking a configuration of a processor of the at least one ECU at step 404 of process 400, step 506 of process 501, or step 602 of process 600, and (ii) comparing the configuration to a reference configuration stored in memory at step 404 of process 400, step 506 of process 501, or step 602 of process 600. For example, the at least one firmware protection status may include one or more of a status indicated by a Joint Test Action Group (JTAG) test access port, a flash readout protection status, a bit setting, a fuse setting, any other suitable state information, or any combination thereof.

In some embodiments, vehicle 310 (e.g., control system 320 thereof) determines the at least one firmware protection status of the at least one ECU by (i) determining the at least ECU does not include firmware and determining the at least one ECU is unlocked at step 404 of process 400, step 506 of process 501, or step 602 of process 600, and then (ii) generating the indicator by generating a diagnostic code indicator corresponding to the at least one ECU at steps 404 and/or 406 of process 400, steps 506 and/or 508 of process 501, or steps 604 and/or 606 of process 600.

In some embodiments, vehicle 310 (e.g., control system 320 thereof) determines the at least one firmware protection status of the at least one ECU by (i) determining the at least ECU includes firmware and determining the at least one ECU is unlocked at step 404 of process 400, step 506 of process 501, or step 602 of process 600, and then (ii) generating the indicator by generating a diagnostic code indicator (e.g., such as a DTC indicator) corresponding to the at least one ECU and causing a malfunction indicator lamp (MIL) to illuminate at steps 404, 406, and/or 410 of process 400, steps 506 and/or 508 of process 501, or steps 604 and/or 606 of process 600.

In some embodiments, vehicle 310 (e.g., control system 320 thereof) determines the at least one firmware protection status of the at least one ECU by (i) determining the at least ECU includes firmware and determining the at least one ECU is locked at step 404 of process 400, step 506 of process 501, or step 602 of process 600 and (ii) determining the at least one firmware protection status corresponds to the at least one ECU being protected (e.g., and not performing further action regarding data protection settings).

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for indicating control protections for a vehicle, the method comprising:
    causing, using control circuitry, instructions stored on at least one electronic control unit (ECU) to execute prior to operation of the vehicle;
    generating, using the control circuitry, a diagnostic code indicator if a data protection setting is disabled for the at least one ECU based on the instructions;
    causing a malfunction indicator lamp (MIL) to illuminate based on the diagnostic code indicator; and
    disabling booting of the at least one ECU from a communications interface based on the diagnostic code indicator.

2. The method of claim 1, wherein determining whether the data protection setting is disabled for the at least one ECU comprises:
    determining a configuration of a processor of the at least one ECU; and
    comparing the configuration to a reference configuration stored in memory.

3. The method of claim 1, wherein the data protection setting comprises at least one of a Joint Test Action Group (JTAG) test access port status, a flash readout protection status, a bit setting, or a fuse setting.

4. The method of claim 1, wherein:
    the vehicle comprises a plurality of ECUs comprising the at least one ECU;
    each ECU of the plurality of ECUs is associated with a subsystem of the vehicle; and
    the diagnostic code indicator comprises at least one identifier corresponding to the at least one ECU, wherein the at least one identifier is distinguishable from identifiers corresponding to other ECUs of the plurality of ECUs.

5. The method of claim 1, further comprising determining the data protection setting is disabled for the at least one ECU by:
    determining the at least one ECU does not include firmware, and
    determining the at least one ECU is unlocked for reading and writing.

6. The method of claim 1, further comprising determining the data protection setting is disabled for the at least one ECU by:
    determining the at least one ECU comprises firmware; and
    determining the at least one ECU is unlocked for reading and writing.

7. The method of claim 1, further comprising determining whether the data protection setting is disabled for the at least one ECU by:
    determining the at least one ECU comprises firmware;
    determining the at least one ECU is locked for reading and writing; and
    determining the data protection setting corresponds to the at least one ECU being protected.

8. The method of claim 1, further comprising:
    linking the diagnostic code indicator to the MIL, wherein the MIL is arranged at a console of the vehicle.

9. The method of claim 1, wherein generating the diagnostic code indicator comprises generating the diagnostic code indicator during manufacturing of the vehicle, the method further comprising:
    identifying the at least one ECU based on the data protection setting; and
    in response to identifying the at least one ECU, performing one of:
        replacing the at least one ECU with a new ECU,
        updating the data protection setting of the at least one ECU to enable protections, or
        flagging the vehicle as noncompliant.

10. The method of claim 1, further comprising transmitting the diagnostic code indicator to a diagnostic port of the vehicle.

11. A system comprising:
    control circuitry configured to:
        causing instructions stored on at least one electronic control unit (ECU) to execute prior to operation of a vehicle; and
        generate a diagnostic code indicator if a data protection setting is disabled for the at least one ECU based on the instructions; and
        disable booting of the at least one ECU from a communications interface based on the diagnostic code indicator; and
    a malfunction indicator lamp (MIL) configured to illuminate on a console of the vehicle based on the diagnostic code indicator.

12. The system of claim 11, wherein the control circuitry is configured to determine the data protection setting for the at least one ECU by:
    determining a configuration of a processor of the at least one ECU; and
    comparing the configuration to a reference configuration stored in memory.

13. The system of claim 11, wherein:
    the vehicle comprises a plurality of ECUs that include the at least one ECU;
    the diagnostic code indicator comprises at least one identifier corresponding to the at least one ECU; and
    the at least one identifier is distinguishable from identifiers corresponding to other ECUs of the vehicle.

14. The system of claim 11, wherein the control circuitry is configured to determine the data protection setting by:
    determining whether the at least one ECU includes firmware, and
    determining whether the at least one ECU is unlocked for reading and writing.

15. The system of claim 11, further comprising:
a diagnostic port configured to provide access to a communications bus of the vehicle; and
wherein the control circuitry is further configured to:
transmit the diagnostic code indicator to the diagnostic port; and
link the diagnostic code indicator to the MIL.

16. The system of claim 11, wherein:
the control circuitry is distributed among a plurality of ECUs; and
the plurality of ECUs are coupled via a communications bus.

17. The system of claim 11, wherein:
the vehicle comprises a plurality of ECUs that include the at least one ECU;
the plurality of ECUs are coupled via a communications bus; and
one ECU of the plurality of ECUs comprises the control circuitry configured to generate the diagnostic code indicator.

18. A non-transitory computer-readable medium having instructions encoded thereon that when executed by control circuitry cause the control circuitry to:
cause diagnostic instructions stored on at least one electronic control unit (ECU) to execute prior to operation of a vehicle;
generate a diagnostic code indicator if a data protection setting is disabled for the at least one ECU based on the diagnostic instructions; and
cause a malfunction indicator lamp (MIL) to illuminate based on the diagnostic code indicator; and
disable booting of the at least one ECU from a communications interface based on the diagnostic code indicator.

19. The non-transitory computer-readable medium of claim 18, further comprising instructions encoded thereon that when executed by the control circuitry cause the control circuitry to determine the data protection setting by:
determining whether the at least one ECU includes firmware, and
determining whether the at least one ECU is unlocked for reading and writing.

* * * * *